(12) United States Patent
Durkee et al.

(10) Patent No.: US 10,717,378 B2
(45) Date of Patent: Jul. 21, 2020

(54) HEADREST FOR A VEHICLE SEAT

(71) Applicant: Faurecia Automotive Seating, LLC, Auburn Hills, MI (US)

(72) Inventors: Chad W. Durkee, Troy, MI (US); Shaun D. Tait, Troy, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 38 days.

(21) Appl. No.: 16/013,183

(22) Filed: Jun. 20, 2018

(65) Prior Publication Data
US 2019/0001853 A1 Jan. 3, 2019

Related U.S. Application Data

(60) Provisional application No. 62/527,362, filed on Jun. 30, 2017.

(51) Int. Cl.
| | | |
|---|---|---|
| *B60N 2/879* | (2018.01) |
| *B60N 2/02* | (2006.01) |
| *B60Q 3/233* | (2017.01) |
| *B60N 2/809* | (2018.01) |
| *B60Q 3/80* | (2017.01) |
| *B60N 2/80* | (2018.01) |

(52) U.S. Cl.
CPC ........... *B60N 2/879* (2018.02); *B60N 2/0244* (2013.01); *B60N 2/809* (2018.02); *B60Q 3/233* (2017.02); *B60Q 3/80* (2017.02); *B60N 2002/899* (2018.02)

(58) Field of Classification Search
CPC ...... B60N 2/879; B60N 2/809; B60N 2/0244; B60N 2002/899; B60Q 3/233
See application file for complete search history.

(56) References Cited

U.S. PATENT DOCUMENTS

| | | | |
|---|---|---|---|
| 5,687,230 A | 11/1997 | Olausson | |
| 6,744,898 B1 | 6/2004 | Hirano | |
| 6,975,737 B2 | 12/2005 | Hirao | |
| 7,609,946 B2 * | 10/2009 | Schedivy | B60N 2/64 386/200 |
| 8,203,657 B2 | 6/2012 | Vitito | |
| 8,240,756 B2 | 8/2012 | Hartlaub | |
| 9,126,514 B2 | 9/2015 | Soar | |
| 9,421,892 B1 * | 8/2016 | Abro | B60R 11/0235 |
| 9,432,716 B2 * | 8/2016 | Liu | B60R 11/0235 |
| 9,802,519 B2 | 10/2017 | Subat | |
| 10,207,616 B2 * | 2/2019 | James | B60N 2/882 |
| 2005/0259523 A1 * | 11/2005 | Kang | G11B 17/051 369/2 |
| 2008/0107257 A1 | 5/2008 | Matthews | |

(Continued)

FOREIGN PATENT DOCUMENTS

| | | |
|---|---|---|
| CN | 2695284 | 4/2005 |
| CN | 208682687 | 4/2019 |

(Continued)

OTHER PUBLICATIONS

French Preliminary Search Report for French App. No. FR1873110 dated Oct. 24, 2019, BET190415 FR, 8 pages.

*Primary Examiner* — Philip F Gabler
(74) *Attorney, Agent, or Firm* — Barnes & Thornburg LLP

(57) ABSTRACT

A vehicle seat includes a seat bottom, a backrest, and a headrest. The vehicle seat may be supplied with power so as to provide a powered experience to the vehicle seat.

16 Claims, 5 Drawing Sheets

(56) References Cited

U.S. PATENT DOCUMENTS

| | | | | |
|---|---|---|---|---|
| 2008/0252798 | A1* | 10/2008 | Vitito | B60K 35/00 |
| | | | | 348/837 |
| 2010/0148550 | A1 | 6/2010 | Kidd | |
| 2013/0181492 | A1* | 7/2013 | Prescott | B60R 7/088 |
| | | | | 297/217.1 |
| 2017/0154006 | A1* | 6/2017 | Tuccinardi | G06F 13/4081 |
| 2019/0001853 | A1* | 1/2019 | Durkee | B60N 2/879 |
| 2019/0061576 | A1* | 2/2019 | Tait | B60N 2/5678 |
| 2019/0210500 | A1* | 7/2019 | Brown | B60N 2/206 |

FOREIGN PATENT DOCUMENTS

| | | | |
|---|---|---|---|
| DE | 19840444 | A1 | 5/1999 |
| DE | 10241132 | A1 | 3/2004 |
| DE | 10261898 | | 7/2004 |
| EP | 3002152 | A1 | 4/2016 |
| FR | 2696388 | | 4/1994 |
| FR | 2768099 | | 3/1999 |
| FR | 2768100 | | 3/1999 |
| GB | 2224178 | A | 4/1990 |
| KR | 20000018331 | | 4/2000 |
| WO | 2015198745 | | 12/2015 |

* cited by examiner

_US 10,717,378 B2_

HEADREST FOR A VEHICLE SEAT

PRIORITY CLAIM

This application claims priority under 35 U.S.C. § 119(e) to U.S. Provisional Application Ser. No. 62/527,362, filed Jun. 30, 2017, which is expressly incorporated by reference herein.

BACKGROUND

The present disclosure relates to an occupant support, and particularly to an occupant support including a seat bottom and a seat back. More particularly, the present disclosure relates to a headrest coupled to the seat back.

SUMMARY

According to the present disclosure, a vehicle seat includes a seat bottom, a seat back, and a headrest. The seat back includes a backrest and a headrest. The headrest may be mounted on the backrest or separated from the backrest. The vehicle seat may be supplied with power so as to provide a powered experience to the occupant of the vehicle seat.

In illustrative embodiments, an electronics system is coupled to the seat back. The electronics system is configured to provide means for receiving an input from a user and providing an output to the user through the headrest in response to receiving the input. The electronics system may receive inputs and provide outputs when the headrest is mounted or separated from the backrest.

In illustrative embodiments, the electronics system includes a power supply configured to supply power to the electronics system when the headrest is either mounted or separated from the backrest. The power supply includes a battery and a charging unit. The charging unit may charge the battery via a direct wired connection or via a wireless connection.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 6:
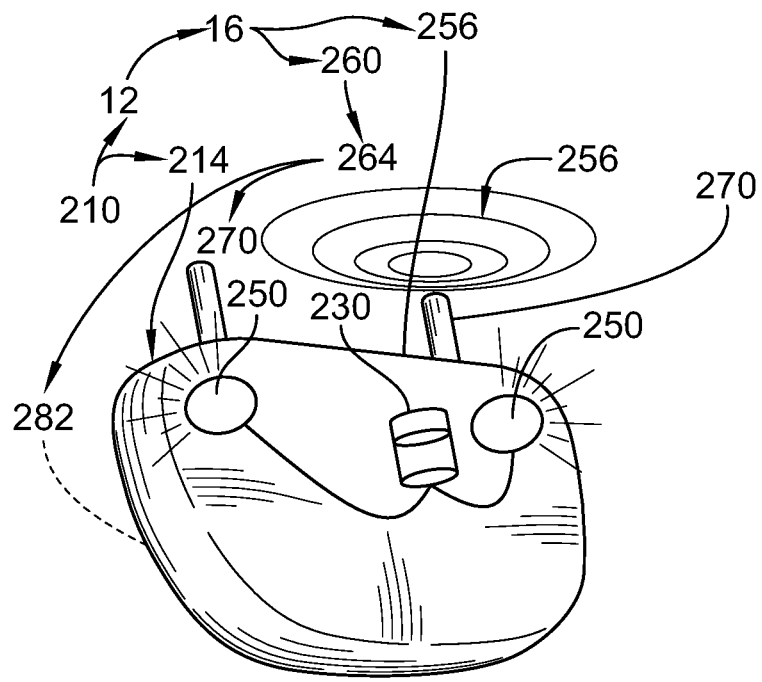
FIG. 6 is a perspective view of a third embodiment of a headrest and electronics system arranged in the separated configuration and showing that power is supplied to the electronics system by the battery to provide functionality to inputs and outputs coupled to the head support.
Figure 7:
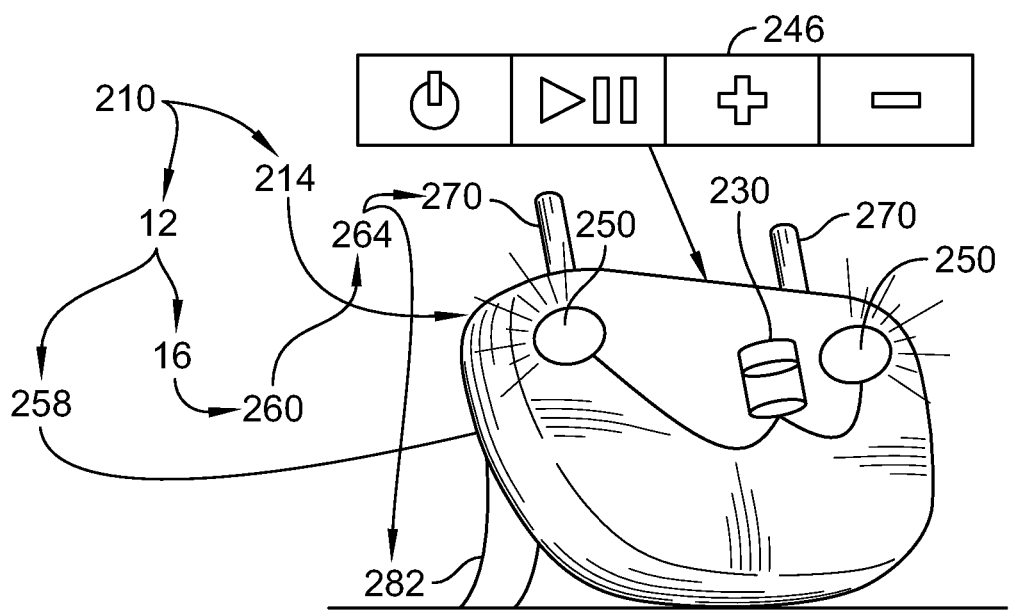
Figure 8:
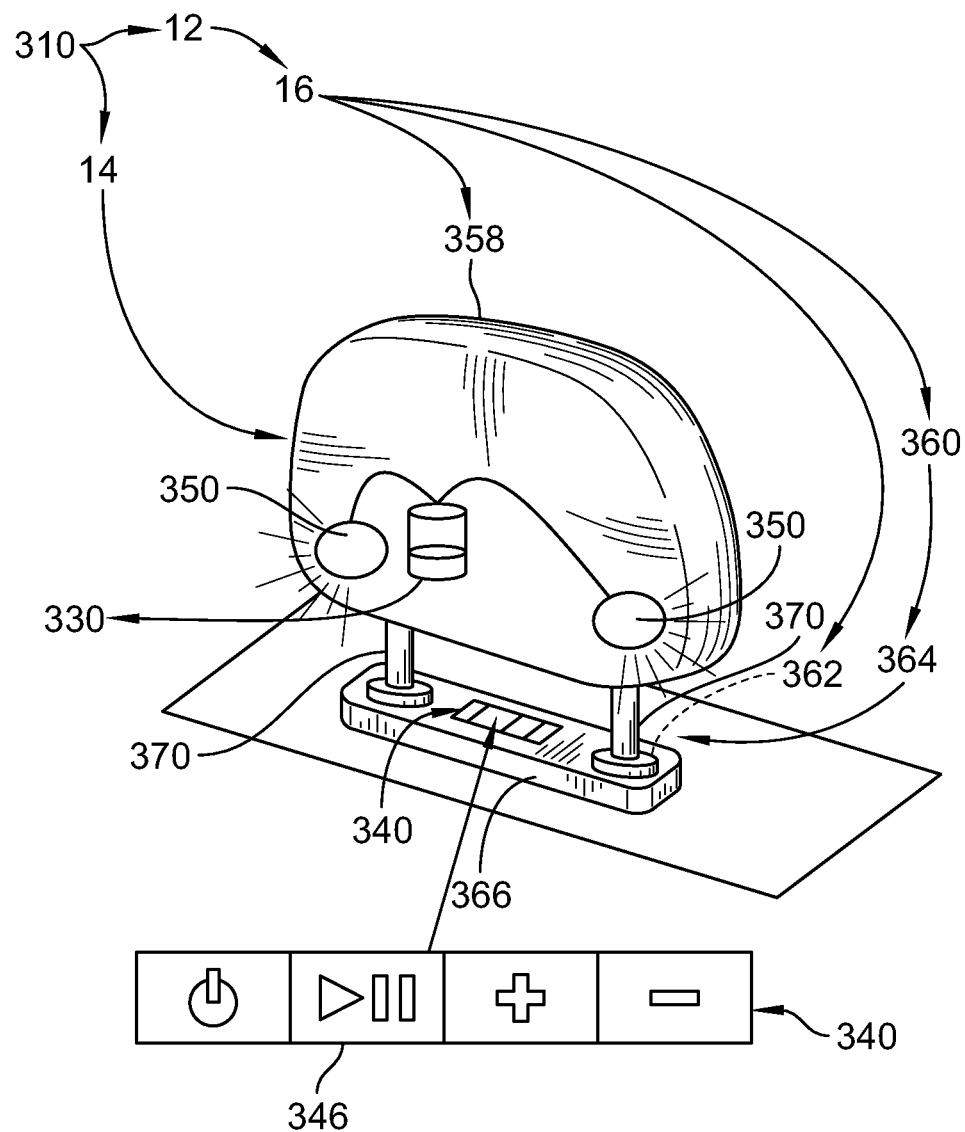

FIG. 7 is a perspective view of the headrest of FIG. 6 in the separated configuration showing that a kickstand is coupled to the head support to support the head support in an inverted position without a passenger holding the head support and suggesting that additional inputs are exposed that may be used, for example, to control sound play back through the speakers coupled to the head support; and FIG. 8 is a partial perspective view of a fourth embodiment of an occupant support showing a headrest in the mounted configuration and showing that inputs included in an electronics system of the occupant support are coupled to the backrest to control, for example, sound play back through speakers coupled to the head support;

DETAILED DESCRIPTION

Figure 1:
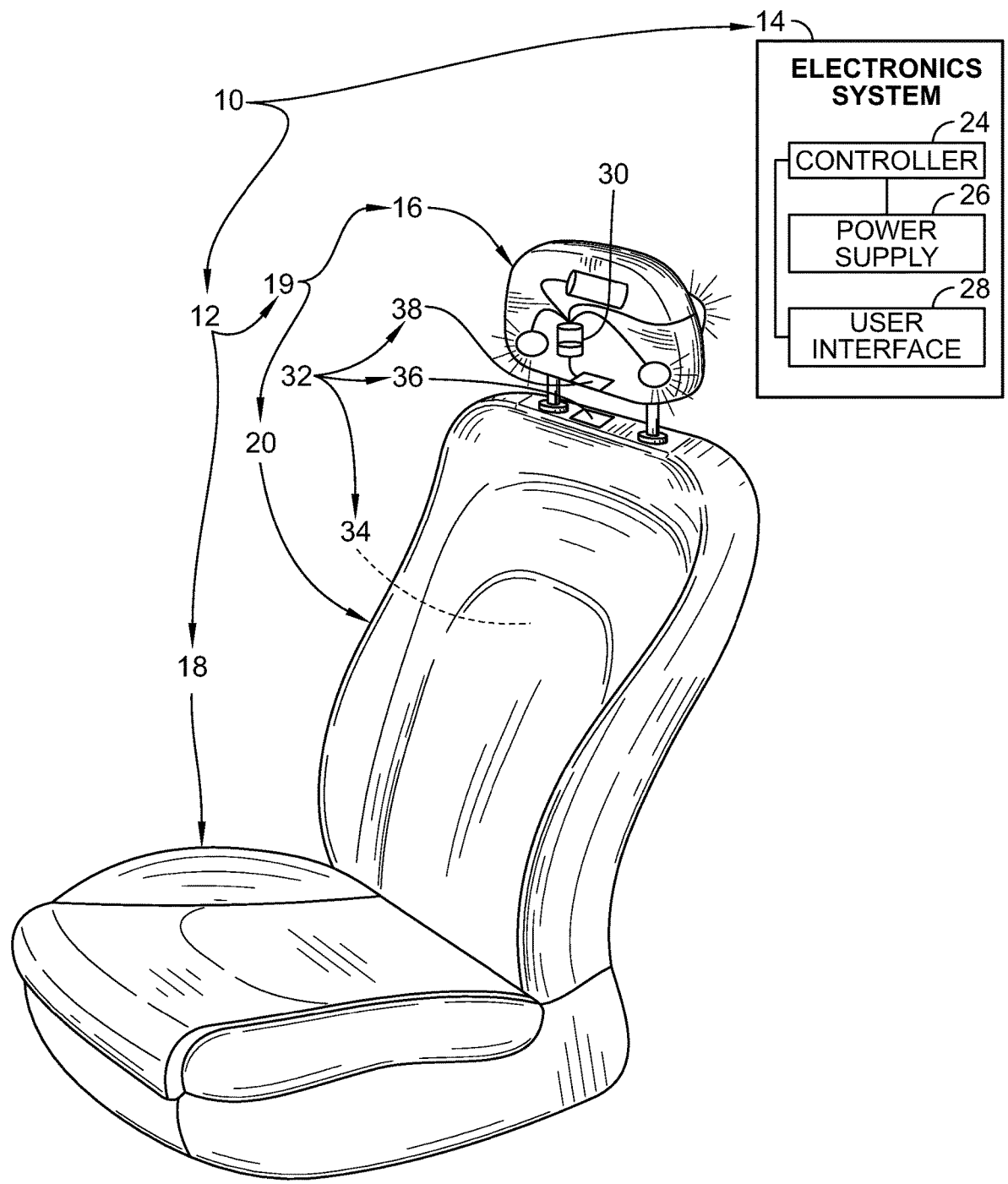
FIG. 1 is a perspective and diagrammatic view of an occupant support in accordance with the present disclosure showing that the occupant support includes a headrest and an electronic system coupled to the headrest for use by a passenger when the headrest is in either a mounted configuration as suggested in FIGS. 2-5 and a separated configuration as suggested in FIGS. 6 and 7.
Figures 2, 3:
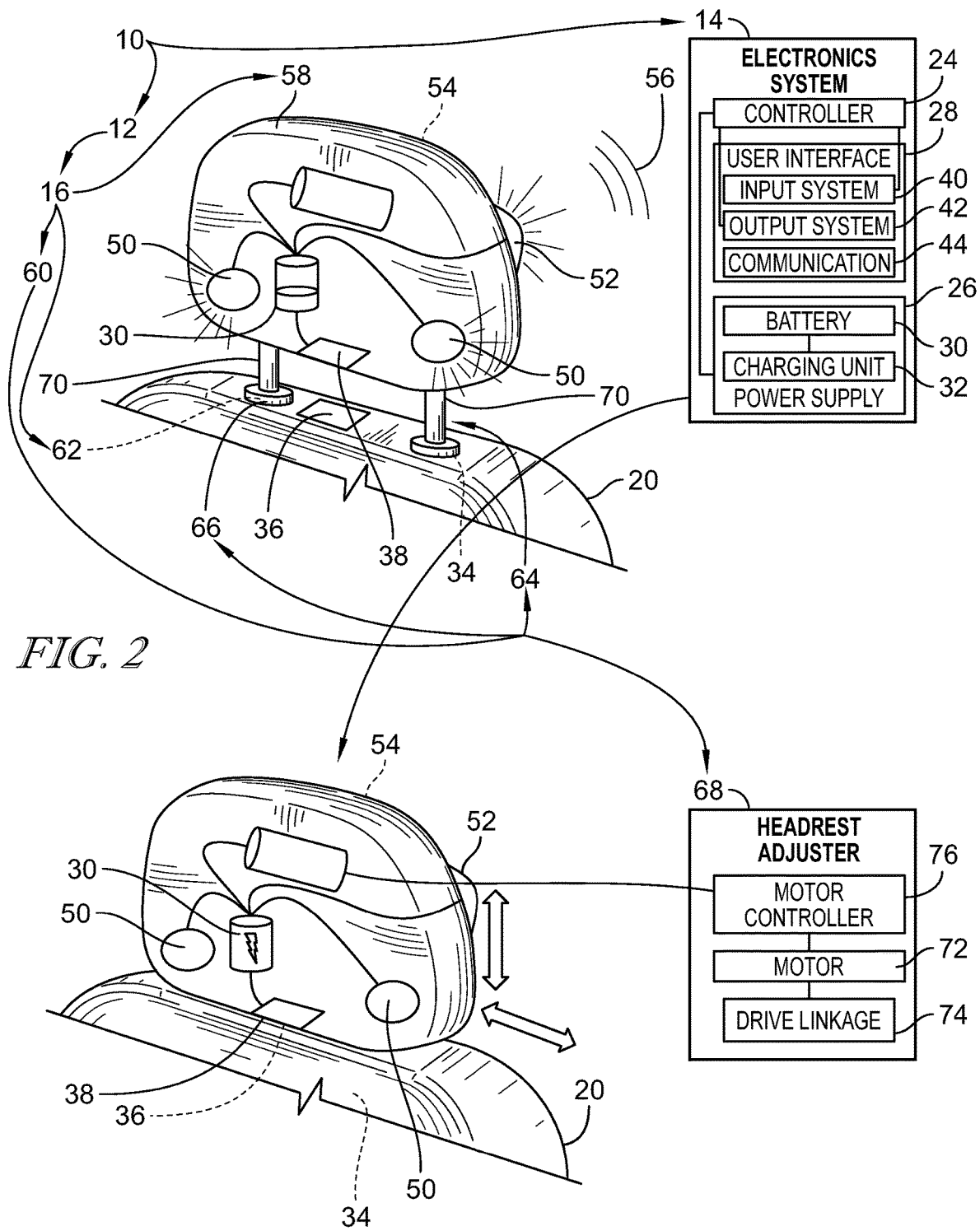
FIG. 2 is a partial perspective and diagrammatic view of the occupant support of FIG. 1 showing the headrest in the mounted configuration on a backrest and the electronic system includes a power supply including a battery, a user interface including speakers and a visual indicator, and a controller.
FIG. 3 is a view similar to FIG. 2 showing that the power supply includes a wired charging unit which charges the batter when an emitter and the receiver of a charging unit are touching one another.
Figure 4:
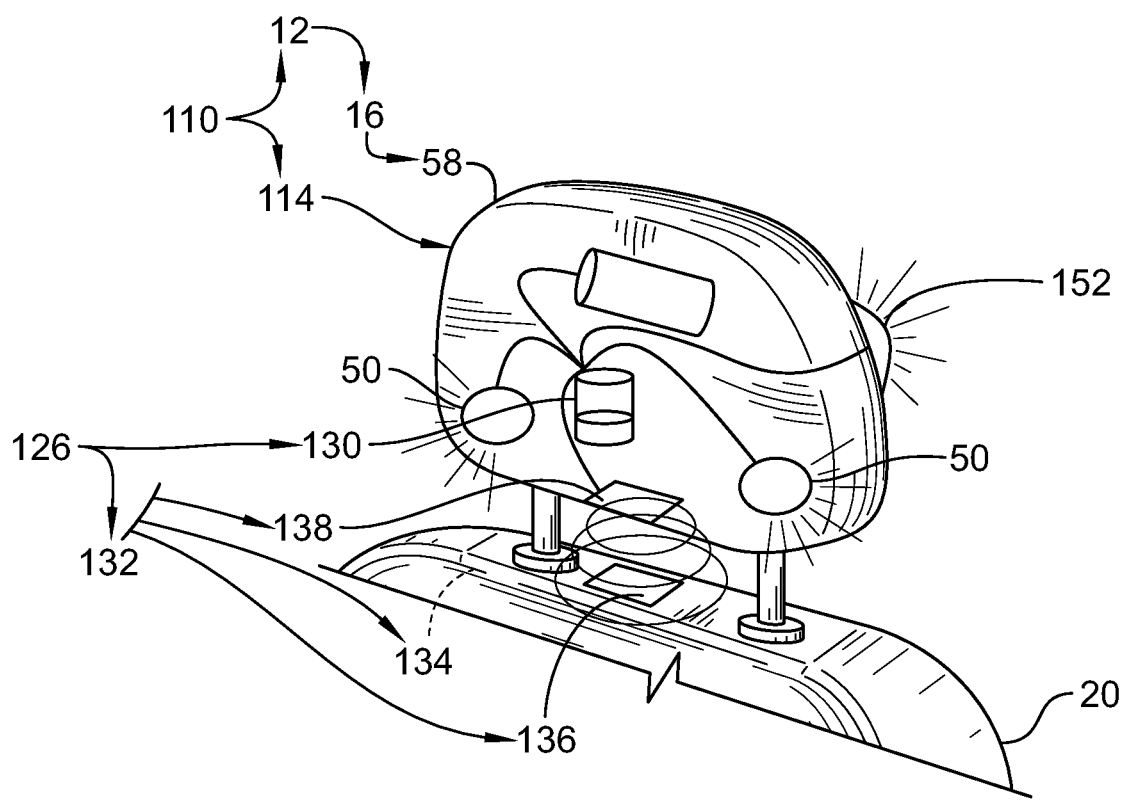
FIG. 4 is a partial perspective of a second embodiment of an occupant support showing that the occupant support includes a headrest and an electronics system including a power supply which is charged by a wireless charging unit.
Figure 5:
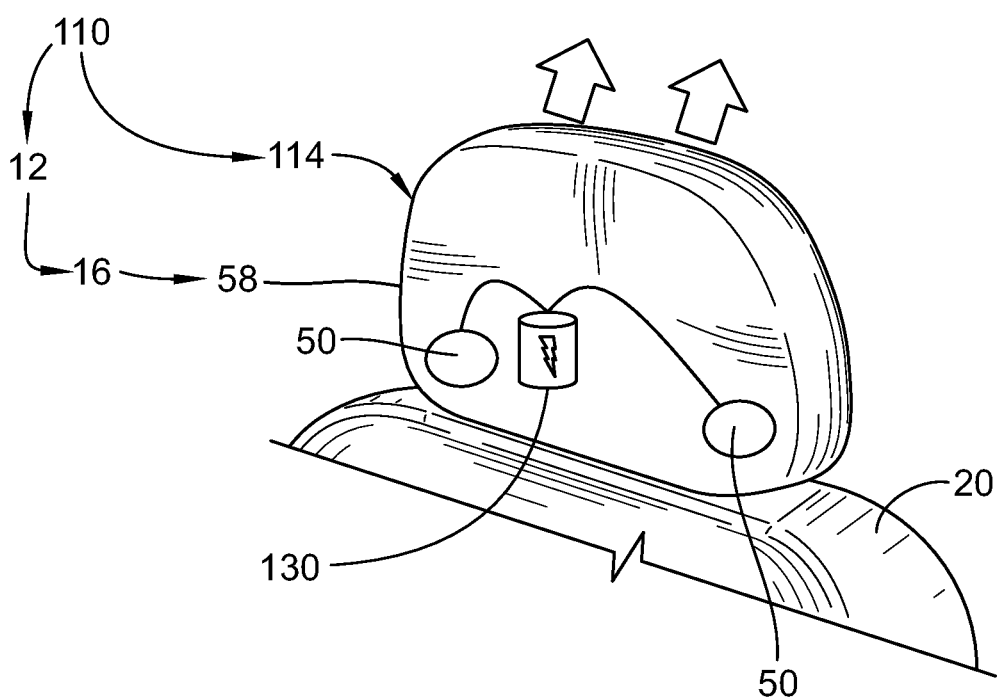
FIG. 5 is a view similar to FIG. 4 suggesting that the a head support included in the headrest and portions of the electronics system may be separated from the backrest to establish the separated configuration as suggested in FIGS. 6 and 7.

A first embodiment of an occupant support 10 is shown in FIGS. 1-3. The occupant support 10 includes a vehicle seat 12 and an electronics system 14 configured to receive inputs from a user and provide outputs to the user through a headrest 16 included in the vehicle seat 12 in response to receiving the inputs when the headrest 16 is in either a mounted configuration shown in FIGS. 1-3 or a separated configuration suggested in FIGS. 6 and 7. A second embodiment of an occupant support 110 is shown in FIGS. 4 and 5. A third embodiment of an occupant support 210 is shown in FIGS. 6 and 7. A fourth embodiment of an occupant support 310 is shown in FIG. 8.

An occupant support 10 includes a vehicle seat 12 and an electronics system 14 as shown in FIGS. 1-3. The vehicle seat 12 includes a seat bottom 18 and a seat back 19 which includes a backrest 20 and a headrest 16 as shown in FIG. 1. The headrest 16 may be configured in one of a mounted configuration in which the headrest 16 is coupled to the backrest 20 to move therewith and a separated configuration in which the headrest 16 is separated from and located in spaced-apart relation to the backrest 20. The electronic system 14 is coupled to the headrest 16 and the backrest 20 and configured to provide an input from a user and provide an output to the user through the headrest 16 in response to receiving the input when the headrest 16 is in either the mounted configuration or the separated configuration.

The electronics system 14 includes a controller 24, a power supply 26, and a user interface 28 as shown in FIGS. 1-3. The controller 24 is configured to receive the input and provide a command associated with the output. The power supply 26 is coupled to the controller 24 to provide power to the controller 24. The user interface 28 is coupled to the controller 24 and is configured to receive inputs from the user. The user interface 28 is also coupled to the controller 24 and configured to provide one or more outputs.

The power supply 26 includes a battery 30 and a charging unit 32 as shown in FIG. 2. The battery 30 is coupled to the controller 24 to provide power to the controller 24 when the headrest 16 is in either the mounted configuration or the separated configuration. The charging unit 32 is coupled to the battery 30 to charge the battery 30 when the headrest 16 is in the mounted configuration.

The charging unit 32 includes a power source 34, an emitter 36, and a receiver 38 as shown in FIGS. 2 and 3. The power source 34 is coupled to the backrest 20. The emitter 36 is coupled to the power source 34 to receive power and is coupled to the backrest 20 to move therewith. The receiver 38 is coupled to the headrest 16 and is configured to receive power from the emitter 36 when the headrest 16 is in the mounted configuration and the emitter 36 is touching the receiver 38 as show in FIG. 3. The charging unit 32 may be referred to as a wired charging unit 32.

The user interface 28 includes an input system 40, an output system 42, and a communication unit 44 as shown in FIGS. 2-3. The input system 40 is configured to provide the input from a user through a button, a sensor, combinations thereof, or any other suitable alternative. The output system 42 is configured to provide the output to the user. The output system includes a speaker 50 coupled to the headrest 16 and the controller 24 that is configured to provide a sound as the output. The output system 42 further includes at least one of a light 52, a screen 54, and a tactile or haptic output as shown in FIGS. 2-3.

The communication unit 44 is coupled to the controller and is configured to receive and send information to the controller as to when to provide the output. In one example, communication unit 44 uses wireless signals 56 to communicate with other systems (e.g., the audio system of the vehicle, the user's phone, or other suitable alternative.) The wireless signals 56 may BLUETOOTH®, Wi-Fi, or any other suitable alternative.

The headrest 16 includes a head support 58, a headrest mount 60, and a headrest retainer 62 as shown in FIG. 2. The head support 58 is adapted to support a head of an occupant resting on the vehicle seat 12. The headrest mount 60 is configured to interconnect the head support 58 to the backrest 20 when the headrest is in the mounted configuration. The headrest retainer 62 is coupled to the backrest 20 and is configured to block selectively changing of the headrest 16 from the mounted configuration as shown in FIGS. 2-5 to the separated configuration as shown in FIGS. 6 and 7.

The headrest mount 60 includes a head-support foundation 64, a foundation receiver 66, and a headrest adjuster 68 as shown in FIGS. 2-3. The head-support foundation 64 is coupled to the head support 58 in a fixed position relative to the head support 58. The foundation receiver 66 is coupled to the backrest 20 in a fixed position relative to the backrest and is configured to receive selectively the head-support foundation 64 therein when the headrest 16 is in the mounted configuration. The headrest adjuster 68 is configured to move the head support 58 relative to the backrest 20 when the headrest 16 is in the mounted configuration as shown in FIG. 5.

The head-support foundation 64 includes two foundation poles 70 as shown in FIG. 2. The two foundation poles 70 are located in spaced-apart relation to one another and are coupled to the head support 58 to extend downwardly toward and into the foundation receiver 66 when the headrest 16 is in the mounted configuration. In another example, the head-support foundation may include only a single pole, rod, or support.

The headrest adjuster 68 includes a motor 72, a drive linkage 74, and a motor controller 76 as shown in FIGS. 2 and 3. The motor 72 is coupled to the head support 58 to move therewith. The drive linkage 74 is coupled to the motor 72 and is configured to move the head support 58 in response to power being supplied to the motor 72 from the electronics system 14. The motor controller 76 is coupled to the motor to control the motor in response to an input from the user interface 28.

An occupant support 110 includes a vehicle seat 12 and an electronics system 114 as shown in FIGS. 4 and 5. The vehicle seat 12 includes a seat bottom 18 and a seat back 19 which includes a backrest 20 and a headrest 16 as shown in FIG. 1. The headrest 16 may be configured in one of a mounted configuration in which the headrest 16 is coupled to the backrest 20 to move therewith and a separated configuration in which the headrest 16 is separated from and located in spaced-apart relation to the backrest 20. The electronics system 114 is coupled to the headrest 16 and the backrest 22 and configured to provide an input from a user and provide an output to the user through the headrest 16 in response to receiving the input when the headrest 16 is in either the mounted configuration or the separated configuration.

The electronics system 114 includes a controller 24, a power supply 126, and a user interface 28 as shown in FIG. 4. The controller 24 is configured to receive the input and provides a command associated with the output. The power supply 126 is coupled to the controller 24 to provide power to the controller 24. The user interface 28 is coupled to the controller 24 and is configured to receive inputs from the user. The user interface 28 is also coupled to the controller 24 and configured to provide the output.

The power supply 126 includes a battery 130 and a charging unit 132 as shown in FIG. 4. The battery 130 is coupled to the controller 24 to provide power to the controller 24 when the headrest 16 is in either the mounted configuration or the separated configuration. The charging unit 132 is coupled to the battery 130 to charge the battery 130 when the headrest 16 is in the mounted configuration.

The charging unit 132 includes a power source 134, an emitter 136, and a receiver 138 as shown in FIGS. 4 and 5. The power source 134 is coupled to the backrest 20. The emitter 136 is coupled to the power source 134 to receive power and is coupled to the backrest 20 to move therewith. The receiver 138 is coupled to the headrest 16 and is configured to receive power from the emitter 136 when the receiver 138 is located in a spaced-apart relation to the emitter and the headrest is in the mounted configuration as seen in FIG. 4. The charging unit 132 may be referred to as a wireless charging unit 132.

The user interface 28 includes an input system, an output system 42, and a communication unit 44 as shown in FIGS. 4 and 5. The input system is configured to provide the input from a user through a button, a sensor, combinations thereof, or any other suitable alternative. The output system 42 is configured to provide the output to the user. The output system includes a speaker 50 coupled to the headrest 16 and the controller 24 that is configured to provide a sound as the output. The output system 42 further includes at least one of a light 52, a screen 54, and a tactile or haptic output as shown in FIGS. 4 and 5. The communication unit 144 is coupled to the controller 24 and is configured to receive and send information to the controller 24 or any other suitable system.

An occupant support 210 includes a vehicle seat 12 and an electronics system 214 as shown in FIGS. 6 and 7. The vehicle seat 12 includes a seat bottom 18 and a seat back 19 which includes a backrest 20 and a headrest 16 as shown in FIG. 1. The headrest 16 may be configured in one of a mounted configuration in which the headrest 16 is coupled to the backrest 20 to move therewith and a separated configuration in which the headrest 16 is separated from and located in spaced-apart relation to the backrest 20. The electronics system 214 is coupled to the headrest 16 and the backrest 20 and configured to provide an input from a user and provide an output to the user through the headrest 16 in response to receiving the input when the headrest 16 is in either the mounted configuration or the separated configuration.

The electronics system 214 includes a controller 224, a power supply 226, and a user interface 228 as shown in FIGS. 6 and 7. The controller 224 is configured to receive the input and provides a command associated with the output. The power supply 226 is coupled to the controller 224 to provide power to the controller 224. The user interface 228 is coupled to the controller 224 and is configured to receive inputs from the user. The user interface 228 is also coupled to the controller 224 and configured to provide the output.

The power supply 226 includes a battery 230 and a charging unit 232 as shown in FIGS. 6 and 7. The battery 230 is coupled to the controller 224 to provide power to the controller 224 when the headrest 16 is in either the mounted configuration or the separated configuration. The charging unit 232 is coupled to the battery 230 to charge the battery 230 when the headrest 16 is in the mounted configuration.

The charging unit 232 includes a power source, an emitter, and a receiver. The power source is coupled to the backrest 20. The emitter is coupled to the power source to receive power and is coupled to the backrest 20 to move therewith. The receiver is coupled to the headrest 16 and is configured to receive power from the emitter.

The user interface 228 includes an input system 240, an output system 242, and a communication unit 244 as shown in FIGS. 6 and 7. The input system 240 is configured to provide the input from a user through a button(s) 246, a sensor, combinations thereof, or any other suitable alternative. The output system 242 is configured to provide the output to the user. The output system 242 includes a speaker 250 coupled to the headrest 16 and the controller 224 that is configured to provide a sound as the output. The output system 242 further includes at least one of a light 252, a screen 254, and a tactile or haptic output as shown in FIGS. 6 and 7.

The communication unit 244 is coupled to the controller 224 and is configured to receive and send information to the controller 224 as to when to provide the output. In one example, communication unit 244 uses wireless signals 256 to communicate with other systems (e.g., the audio system of the vehicle, the user's phone, or other suitable alternative.) The wireless signals 256 may BLUETOOTH®, Wi-Fi, or any other suitable alternative.

The headrest 16 includes a head support 25 and a headrest mount 260, and a headrest retainer as shown in FIGS. 6 and 7. The head support 258 is adapted to support a head of an occupant resting on the vehicle seat 12. The headrest mount 260 is configured to interconnect the head support 258 to the backrest 20 when the headrest 16 is in the mounted configuration. The headrest retainer is coupled to the backrest 20 and is configured to block selectively changing of the headrest 16 from the mounted configuration as shown in FIGS. 2-5 to the separated configuration as shown in FIGS. 6 and 7.

The headrest mount 260 includes a head-support foundation 264, a foundation receiver, and a headrest adjuster as shown in FIGS. 6 and 7. The head-support foundation 264 is coupled to the head support 258 in a fixed position relative to the head support 258. The foundation receiver is coupled to the backrest 20 in a fixed position relative to the backrest 20 and is configured to receive selectively the head-support foundation 264 therein when the headrest 16 is in the mounted configuration. The headrest adjuster is configured to move the head support 258 relative to the backrest 20 when the headrest 16 is in the mounted configuration as shown in FIG. 5.

The head-support foundation 264 includes two foundation poles 270 and a kickstand 282 as shown in FIG. 7. The two foundation poles 270 are located in spaced-apart relation to one another and are coupled to the head support 258 to extend downwardly toward and into the foundation receiver 266 when the headrest 16 is in the mounted configuration. The kickstand 282 is coupled to the head support 258 in spaced-apart relation to the headrest mount 260 and configured to support the head support 258 when the headrest is in the separated configuration as shown in FIG. 7.

An occupant support 310 includes a vehicle seat 12 and an electronics system 14 as shown in FIGS. 1-3. The vehicle seat 12 includes a seat bottom 18 and a seat back 19 which includes a backrest 20 and a headrest 16 as shown in FIG. 1. The headrest 16 may be configured in one of a mounted configuration in which the headrest 16 is coupled to the backrest 20 to move therewith and a separated configuration in which the headrest 16 is separated from and located in spaced-apart relation to the backrest 20. The electronic system 14 is coupled to the headrest 16 and the backrest 22 and configured to provide an input from a user and provide an output to the user through the headrest 16 in response to receiving the input when the headrest 16 is in either the mounted configuration or the separated configuration.

The electronics system 314 includes a controller 324, a power supply 326, and a user interface 328 as shown in FIG. 9. The controller 324 is configured to receive the input and provides a command associated with the output. The power supply 326 is coupled to the controller 324 to provide power to the controller 324. The user interface 328 is coupled to the controller 324 and is configured to receive inputs from the user. The user interface 328 is also coupled to the controller 324 and configured to provide the output.

The power supply 326 includes a battery 330 and a charging unit 332 as shown in FIG. 2. The battery 330 is coupled to the controller 324 to provide power to the controller 24 when the headrest 16 is in either the mounted configuration or the separated configuration. The charging unit 332 is coupled to the battery 330 to charge the battery 330 when the headrest 16 is in the mounted configuration.

The charging unit 332 includes a power source, an emitter, and a receiver as shown in FIGS. 2 and 3. The power source is coupled to the backrest 20. The emitter is coupled to the power source to receive power and is coupled to the backrest 20 to move therewith. The receiver is coupled to the headrest 16 and is configured to receive power from the emitter when the headrest 16 is in the mounted configuration and the emitter is touching the receiver as show in FIG. 3.

The user interface 328 includes an input system 340, an output system 342, and a communication unit as shown in FIGS. 1-3. The input system 340 is configured to provide the input from a user through a button 346, a sensor, combinations thereof, or any other suitable alternative. The output system 342 is configured to provide the output to the user. The output system includes a speaker 350 coupled to the headrest 16 and the controller 24 that is configured to provide a sound as the output. The output system 342 further includes at least one of a light, a screen, and a tactile output as shown in FIGS. 2-3. The communication unit is coupled to the controller and is configured to receive and send information to the controller as to when to provide the output.

The headrest 16 includes a head support 358, a headrest mount 360, and a headrest retainer 362 as shown in FIGS. 4 and 5. The head support 358 is adapted to support a head of an occupant resting on the vehicle seat 12. The headrest mount 360 is configured to interconnect the head support 358 to the headrest mount 360 when the headrest 16 is in the mounted configuration. The headrest retainer 362 is coupled to the headrest mount 360 and is configured to block selectively changing of the headrest 16 from the mounted configuration as shown in FIGS. 2-5 to the separated configuration as shown in FIGS. 6 and 7.

The headrest mount 360 includes a head-support foundation 364 and a foundation receiver 366 as shown in FIG. 9. The head-support foundation 364 is coupled to the head support 358 in a fixed position relative to the head support 358. The foundation receiver 366 is coupled to the head-support foundation 364 in a fixed position relative to the head-support foundation and is configured to receive selectively the head-support foundation 364 therein when the headrest 16 is in the mounted configuration.

The head-support foundation 364 includes two foundation poles 370 as shown in FIG. 9. The two foundation poles 370 are located in spaced-apart relation to one another and are coupled to the head support 358 to extend downwardly toward and into the foundation receiver 366 when the headrest 16 is in the mounted configuration.

The following numbered clauses include embodiments that are contemplated and non-limiting:

Clause 1. An occupant support comprising a vehicle seat including a seat bottom and a seat back coupled to the seat bottom to extend upwardly away from the seat bottom and move relative to the seat bottom.

Clause 2. The occupant support of clause 1, any other clause, or any combination of clauses, wherein the seat back includes a backrest and a headrest configured in one of a mounted configuration in which the headrest is coupled to the backrest to move therewith and a separated configuration in which the headrest is separated from and located in spaced-apart relation to the backrest.

Clause 3. The occupant support of clause 2, any other clause, or any combination of clauses, further comprising an electronic system coupled to the seat back and configured to provide means for receiving an input from a user and providing an output to the user through the headrest in response to receiving the input when the headrest is in either the mounted configuration or the separated configuration.

Clause 4. The occupant support of clause 2, any other clause, or any combination of clauses, further comprising an electronic system coupled to the seat back and configured to receive an input from a user and provide an output to the user through the headrest in response to receiving the input when the headrest is in either the mounted configuration or the separated configuration.

Clause 5. The occupant support of clause 4, any other clause, or any combination of clauses, wherein the electronic system includes a controller configured to receive the input and provide a command associated with the output, a power supply coupled to the controller to provide power to the controller, and a user interface coupled to the controller and configured to receive inputs from the user and provide the output.

Clause 6. The occupant support of clause 5, any other clause, or any combination of clauses, wherein the power supply includes a battery coupled to the controller to provide power to the controller when the headrest is in either the mounted configuration or the separated configuration and a charging unit coupled to the battery to charge the battery when the headrest is in the mounted configuration.

Clause 7. The occupant support of clause 6, any other clause, or any combination of clauses, wherein the charging unit includes a source of power coupled to the backrest, an emitter coupled to the source of power to receive power and coupled to the backrest to move therewith, and a receiver coupled to the headrest and configured to receive power from the emitter when the headrest is in the mounted configuration and the emitter is touching the receiver.

Clause 8. The occupant support of clause 7, any other clause, or any combination of clauses, wherein the receiver receives power from the emitter when the receiver is located in spaced-apart relation to the emitter and the headrest is in the mounted configuration.

Clause 9. The occupant support of clause 5, any other clause, or any combination of clauses, wherein the user interface includes an input system configured to provide the input and an output system configured to provide the output.

Clause 10. The occupant support of clause 9, any other clause, or any combination of clauses, wherein the input system includes at least one of a button coupled to the headrest and a sensor coupled to the headrest.

Clause 11. The occupant support of clause 9, any other clause, or any combination of clauses, wherein the output system includes a speaker coupled to the headrest and the controller and configured to provide a sound as the output.

Clause 12. The occupant support of clause 11, any other clause, or any combination of clauses, wherein the output system further includes at least one of a light coupled to the headrest, a screen coupled to the headrest, and a tactile output coupled to the headrest.

Clause 13. The occupant support of clause 9, any other clause, or any combination of clauses, wherein the user interface further includes a communication unit coupled to the controller and configured to receive and send information to the controller.

Clause 14. The occupant support of clause 4, any other clause, or any combination of clauses, wherein the headrest includes a head support adapted to support a head of an occupant resting on the vehicle seat, a headrest mount configured to interconnect the head support to the backrest when the headrest is in the mounted configuration, and a headrest retainer coupled to the backrest and configured to block selectively changing of the headrest from the mounted configuration to the separated configuration.

Clause 15. The occupant support of clause 14, any other clause, or any combination of clauses, wherein the headrest mount includes a head-support foundation coupled to the head support in a fixed position relative to the head support, a foundation receiver coupled to the backrest in a fixed position relative to the backrest and configured to receive selectively the head-support foundation therein when the headrest is in the mounted configuration.

Clause 16. The occupant support of clause 15, any other clause, or any combination of clauses, wherein the headrest-support foundation further includes a kickstand coupled to the head support in spaced-apart relation to the headrest mount and configured to support the head support when the headrest is in the separated configuration.

Clause 17. The occupant support of clause 15, any other clause, or any combination of clauses, wherein the headrest mount further includes a headrest adjuster configured to move the head support relative to the backrest when the headrest is in the mounted configuration, wherein the head-support foundation includes two foundation poles located in spaced-apart relation to one another and coupled to the head support to extend downwardly toward and into the foundation receiver when the headrest is in the mounted configuration, wherein the headrest adjuster includes a motor coupled to the head support to move therewith and a drive linkage coupled to the motor and configured to move the head support in response to power being supplied to the motor from the electronics system, and wherein the headrest-support foundation further includes a kickstand coupled to the head support in spaced-apart relation to the two foundation poles and configured to support the head support when the headrest is in the separated configuration.

Clause 18. The occupant support of clause 17, any other clause, or any combination of clauses, wherein the electronic system includes a controller configured to receive the input and provide a command associated with the output, a power supply coupled to the controller to provide power to the controller, and a user interface coupled to the controller and configured to receive inputs from the user and provide the output, wherein the power supply includes a battery coupled to the controller to provide power to the controller when the headrest is in either the mounted configuration or the separated configuration and a charging unit coupled to the battery to charge the battery when the headrest is in the mounted configuration, and wherein the charging unit includes a source of power coupled to the backrest, an emitter coupled to the source of power to receive power and coupled to the backrest to move therewith, and a receiver coupled to the headrest and configured to receive power from the emitter when the headrest is in the mounted configuration and the emitter is touching the receiver.

Clause 19. The occupant support of clause 18, any other clause, or any combination of clauses, wherein the receiver receives power from the emitter when the receiver is located in spaced-apart relation to the emitter and the headrest is in the mounted configuration.

Clause 20. The occupant support of clause 18, any other clause, or any combination of clauses, wherein the user interface includes an input system configured to provide the input and an output system configured to provide the output.

Clause 21. The occupant support of clause 20, any other clause, or any combination of clauses, wherein the output system includes a speaker coupled to the headrest and the controller and configured to provide a sound as the output.

Clause 22. The occupant support of clause 21, any other clause, or any combination of clauses, wherein the output system further includes at least one of a light coupled to the headrest, a screen coupled to the headrest, and a tactile output coupled to the headrest.

Clause 23. The occupant support of clause 20, any other clause, or any combination of clauses, wherein the user interface further includes a communication unit coupled to the controller and configured to receive and send information to the controller.

The invention claimed is:

1. An occupant support comprising
a vehicle seat including a seat bottom and a seat back coupled to the seat bottom to extend upwardly away from the seat bottom and move relative to the seat bottom, the seat back including a backrest and a headrest configured in one of a mounted configuration in which the headrest is coupled to the backrest to move therewith and a separated configuration in which the headrest is separated from and located in spaced-apart relation to the backrest, and an electronic system coupled to the seat back and configured to provide means for receiving an input from a user and providing an output to the user through the headrest in response to receiving the input when the headrest is in either the mounted configuration or the separated configuration, wherein the electronic system includes a controller configured to receive the input and provide a command associated with the output, a power supply coupled to the controller to provide power to the controller, and a user interface coupled to the controller and configured to receive inputs from the user and provide the output, wherein the power supply includes a battery coupled to the controller to provide power to the controller when the headrest is in either the mounted configuration or the separated configuration and a charging unit coupled to the battery to charge the battery when the headrest is in the mounted configuration, wherein the battery, controller, and user interface are integral with the headrest, and the charging unit is integral with the backrest, wherein the headrest includes a head support adapted to support a head of an occupant resting on the vehicle seat, a headrest mount configured to interconnect the head support to the backrest when the headrest is in the mounted configuration, and a headrest retainer coupled to the backrest and configured to block selectively changing of the headrest from the mounted configuration to the separated configuration, wherein the headrest mount includes a head support foundation coupled to the head support in a fixed position relative to the head support, a foundation receiver coupled to the backrest in a fixed position relative to the backrest and configured to receive selectively the head support foundation therein when the headrest is in the mounted configuration wherein the headrest-support foundation further includes a kickstand coupled to the head support in spaced-apart relation to the headrest mount and configured to support the head support when the headrest is in the separated configuration.

2. The occupant support of claim 1, wherein the charging unit includes a source of power coupled to the backrest, an emitter coupled to the source of power to receive power and coupled to the backrest to move therewith, and a receiver coupled to the headrest and configured to receive power from the emitter when the headrest is in the mounted configuration and the emitter is touching the receiver.

3. The occupant support of claim 2, wherein the receiver receives power from the emitter when the receiver is located in spaced-apart relation to the emitter and the headrest is in the mounted configuration.

4. The occupant support of claim 1, wherein the user interface includes an input system configured to provide the input and an output system configured to provide the output and the output system includes a speaker coupled to the controller to provide a sound as the output.

5. The occupant support of claim 4, wherein the input system includes at least one of a button coupled to the headrest and a sensor coupled to the headrest.

6. The occupant support of claim 4, wherein the speaker is coupled to the headrest.

7. The occupant support of claim 6, wherein the output system further includes at least one of a light coupled to the headrest, a screen coupled to the headrest, and a tactile output coupled to the headrest.

8. The occupant support of claim 4, wherein the user interface further includes a communication unit coupled to the controller and configured to receive and send information to the controller.

9. An occupant support comprising
a vehicle seat including a seat bottom and a seat back coupled to the seat bottom to extend upwardly away from the seat bottom and move relative to the seat bottom, the seat back including a backrest and a headrest configured in one of a mounted configuration in which the headrest is coupled to the backrest to move therewith and a separated configuration in which the headrest is separated from and located in spaced-apart relation to the backrest,
an electronic system coupled to the seat back and configured to provide means for receiving an input from a user and providing an output to the user through the headrest in response to receiving the input when the headrest is in either the mounted configuration or the separated configuration,
wherein the electronic system includes a controller configured to receive the input and provide a command associated with the output, a power supply coupled to the controller to provide power to the controller, and a user interface coupled to the controller and configured to receive inputs from the user and provide the output,
wherein the power supply includes a battery coupled to the controller to provide power to the controller when the headrest is in either the mounted configuration or the separated configuration and a charging unit coupled to the battery to charge the battery when the headrest is in the mounted configuration,
wherein the battery, controller, and user interface are integral with the headrest, and the charging unit is integral with the backrest,
wherein the headrest includes a head support adapted to support a head of an occupant resting on the vehicle seat, a headrest mount configured to interconnect the head support to the backrest when the headrest is in the mounted configuration, and a headrest retainer coupled to the backrest and configured to block selectively changing of the headrest from the mounted configuration to the separated configuration,
wherein the headrest mount includes a head support foundation coupled to the head support in a fixed position relative to the head support, a foundation receiver coupled to the backrest in a fixed position relative to the backrest and configured to receive selectively the head support foundation therein when the headrest is in the mounted configuration,
wherein the headrest mount further includes a headrest adjuster configured to move the head support relative to the backrest when the headrest is in the mounted configuration, wherein the head support foundation includes two foundation poles located in spaced-apart relation to one another and coupled to the head support to extend downwardly toward and into the foundation receiver when the headrest is in the mounted configuration, wherein the headrest adjuster includes a motor coupled to the head support to move therewith and a drive linkage coupled to the motor and configured to move the head support in response to power being supplied to the motor from the electronics system, and wherein the headrest-support foundation further includes a kickstand coupled to the head support in spaced-apart relation to the two foundation poles and configured to support the head support when the headrest is in the separated configuration.

10. The occupant support of claim 9, wherein the electronic system includes a controller configured to receive the input and provide a command associated with the output, a power supply coupled to the controller to provide power to the controller, and a user interface coupled to the controller and configured to receive inputs from the user and provide the output, wherein the power supply includes a battery coupled to the controller to provide power to the controller when the headrest is in either the mounted configuration or the separated configuration and a charging unit coupled to the battery to charge the battery when the headrest is in the mounted configuration, and wherein the charging unit includes a source of power coupled to the backrest, an emitter coupled to the source of power to receive power and coupled to the backrest to move therewith, and a receiver coupled to the headrest and configured to receive power from the emitter when the headrest is in the mounted configuration and the emitter is touching the receiver.

11. The occupant support of claim 10, wherein the receiver receives power from the emitter when the receiver is located in spaced-apart relation to the emitter and the headrest is in the mounted configuration.

12. The occupant support of claim 10, wherein the user interface includes an input system configured to provide the input and an output system configured to provide the output and the output system includes a speaker coupled to the controller to provide a sound as the output.

13. The occupant support of claim 12, wherein the output system includes a speaker coupled to the headrest.

14. The occupant support of claim 13, wherein the output system further includes at least one of a light coupled to the headrest, a screen coupled to the headrest, and a tactile output coupled to the headrest.

15. The occupant support of claim 12, wherein the user interface further includes a communication unit coupled to the controller and configured to receive and send information to the controller.

16. The occupant support of claim 1, wherein the battery, controller, and user interface are coupled to the headrest and are located in a space formed in the headrest.

* * * * *